March 29, 1932.　　　G. T. R. HILL　　　1,851,907
AIR BRAKES FOR AIRCRAFT
Filed Jan. 9, 1931　　　4 Sheets-Sheet 3
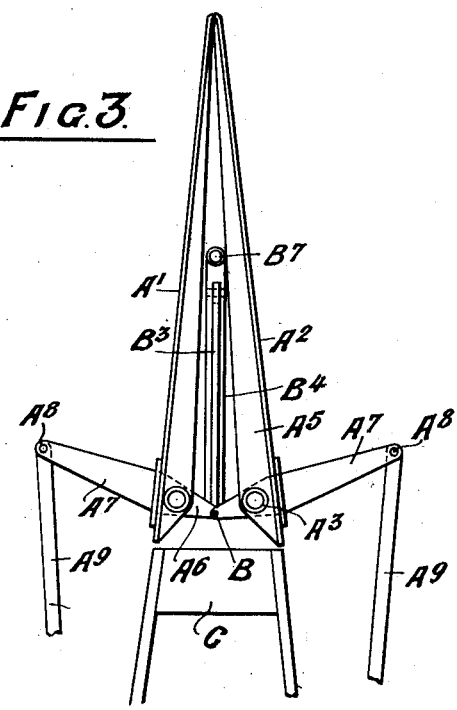
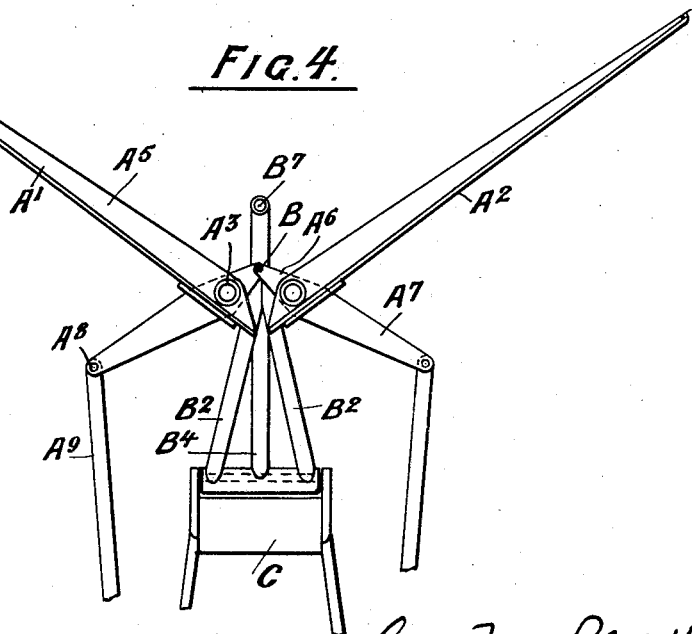

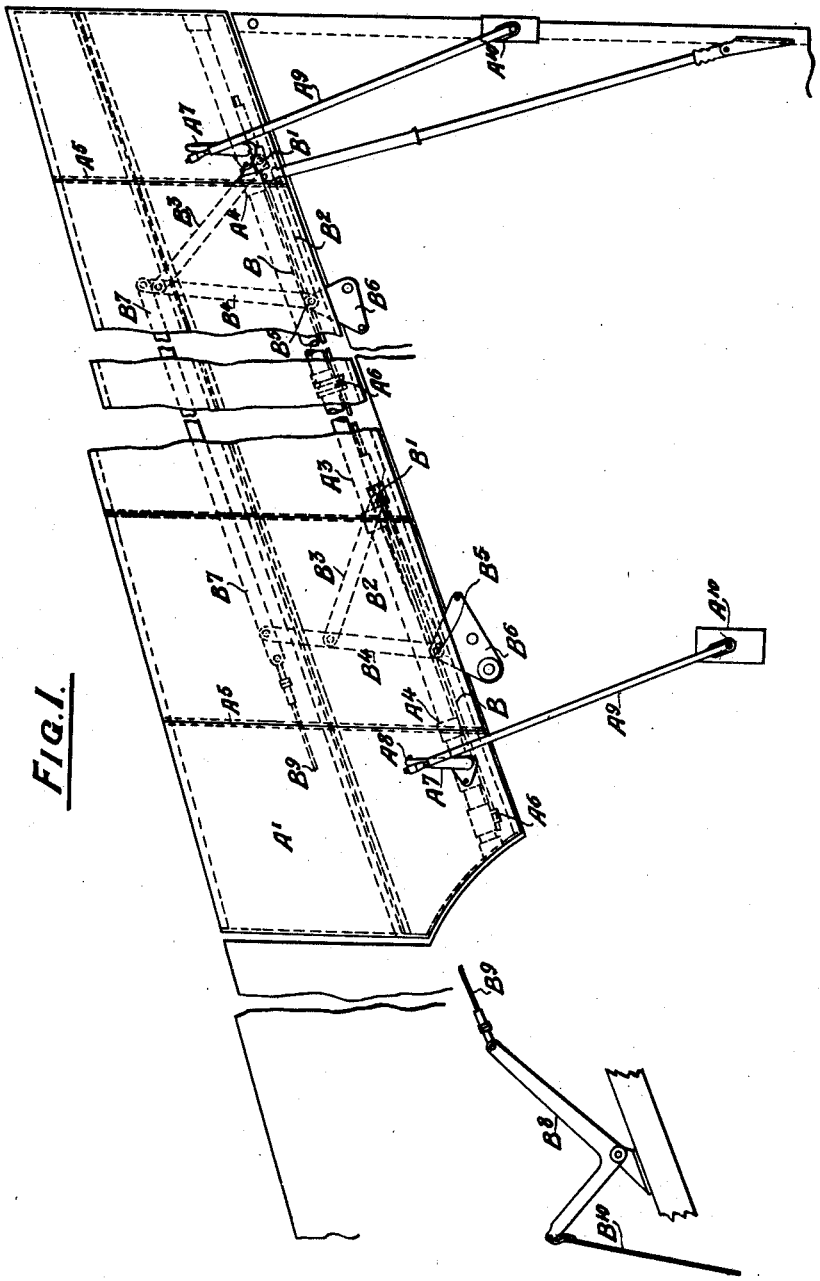

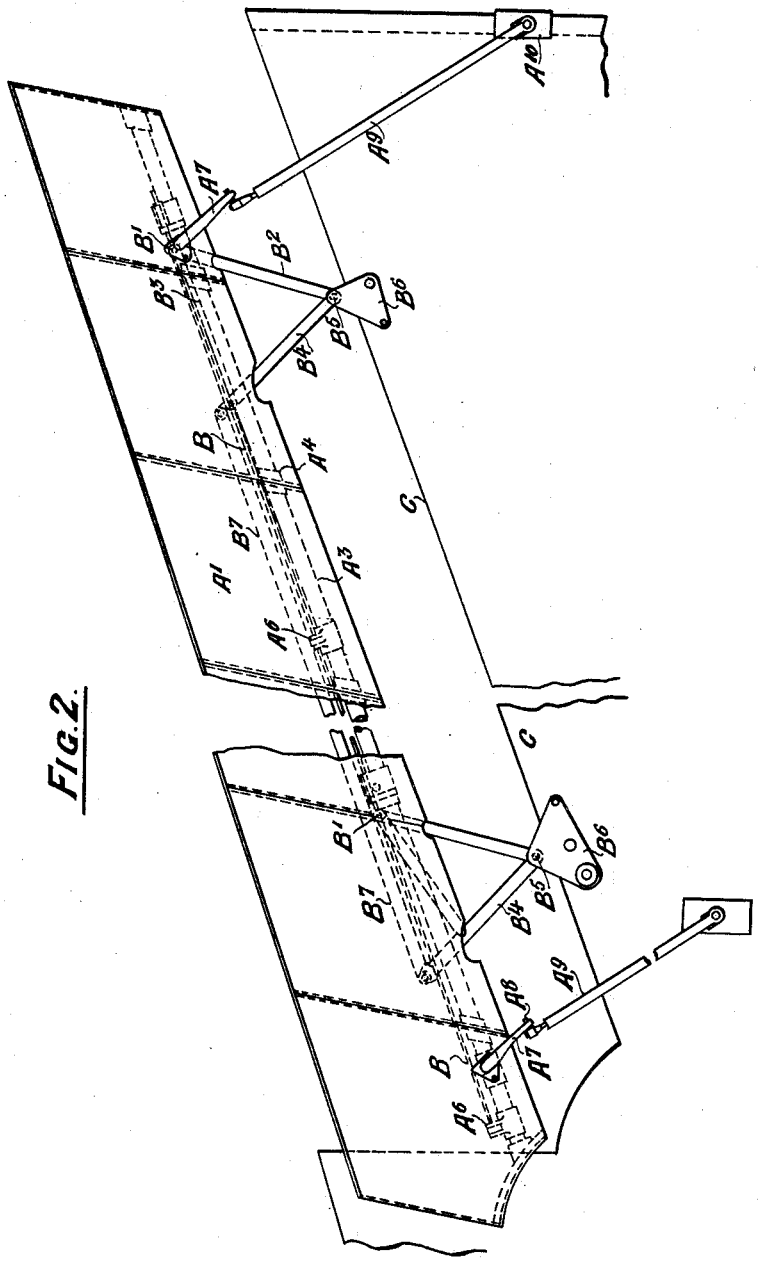

March 29, 1932.  G. T. R. HILL  1,851,907
AIR BRAKES FOR AIRCRAFT
Filed Jan. 9, 1931  4 Sheets-Sheet 4
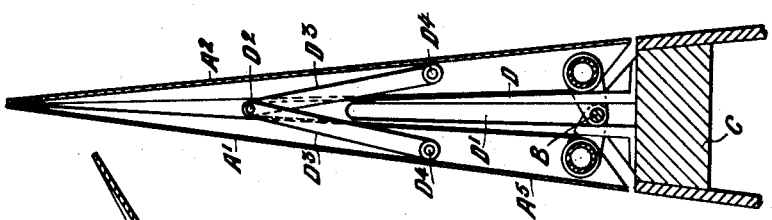
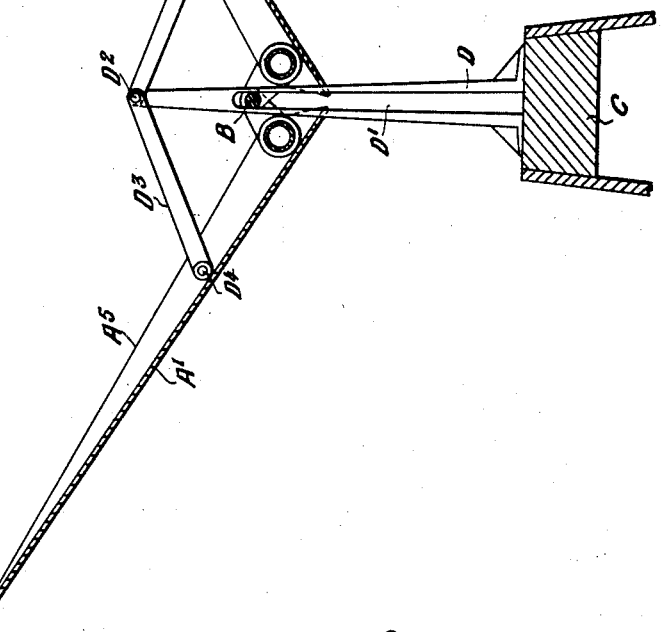

Patented Mar. 29, 1932

1,851,907

UNITED STATES PATENT OFFICE

GEOFFREY TERENCE ROLAND HILL, OF YEOVIL, ENGLAND, ASSIGNOR TO PETTERS LIMITED, OF YEOVIL, SOMERSET, ENGLAND

AIR BRAKES FOR AIRCRAFT

Application filed January 9, 1931, Serial No. 507,734, and in Great Britain January 15, 1930.

This invention relates to air brakes for application to the trailing edge of aircraft wings, the object of the invention being to increase the resistance of such wings when such brakes are adjusted to the braking position. The brakes may be fitted to extend to any distance laterally to the line of flight, and the aim of the invention is so to construct the said brakes that they may be operated to apply the braking effect with a minimum of power to be exerted manually by the operator of the machine.

In the operation of ailerons and other hinged resistance surfaces, it has already been proposed to provide an auxiliary pivoted surface which auxiliary pivoted surface in itself acts as a servo-surface to operate the main surface which main surface would exert too great resistance for convenient manual operation unless so assisted or operated by such auxiliary pivoted surface.

According to the present invention, instead of employing an auxiliary pivoted surface to operate the main resistance surface and instead of the main resistance surface being angularly adjustable about a fixed hinge, the main resistance surface is angularly adjustable about a hinge which is permitted to travel bodily backwards relatively to the direction of flight in proportion to the angular adjustment given to the resistance surface. Thus the resistance of the said surface to angular adjustment in the air stream, which would require considerable power to overcome, is counteracted by power derived from permitting the surface as a whole to travel backward simultaneously with the increase in angular adjustment.

In a simple form of application of this invention, the surface, instead of being angularly adjustable at its leading edge is angularly adjustable about a hinge distanced from the plane of the resistance surface. This movement may be secured about a single hinge, or where it is desired that the leading edge of the resistance surface shall be retained in the line of the chord of the main surface, links may be provided which permit the leading edge of the surface to travel backwards in the plane of the wing chord while the resistance surface itself is increasing in angular adjustment as the leading edge of such surface is moving in a rearward direction.

The invention is particularly suitable for air brakes in which there are two surfaces angularly adjustable in opposite directions simultaneously. In such constructions both surfaces are hinged together and the hinged portion is caused to travel backwards while the surfaces open about their hinge in opposite directions. The resistance surface will be controlled in such adjustment by link motions or other means for determining the proportion of mutual angular adjustment to the total bodily displacement in a rearward direction.

The invention will now be described with reference to the embodiment shown in the accompanying drawings as applied to air brakes, in which there are two surfaces angularly adjustable in opposite directions simultaneously, in which:—

Figure 1 is a plan view illustrating a fragmentary part of the wing of aircraft, and illustrating the application of the resistance surface to said wing, with the resistance surface in its non-effective position. Only the upper resistance surface is seen in the figure, the other surface being underneath the wing immediately below the resistance surface shown.

Figure 2 is a similar view to Figure 1, but with the resistance surface in its effective braking position.

Figure 3 is an end view of the wing with the resistance surfaces in the position shown in Figure 1.

Figure 4 is an end view of the wing with the resistance surfaces in the position shown in Figure 2.

Figures 5 and 6 illustrate similar views to Figures 3 and 4 of a modification.

In the construction shown in Figures 1–4, the two angularly adjustable resistance surfaces $A^1$ $A^2$ are each provided with tubular members $A^3$ fixed in bearings $A^4$ on flanges $A^5$ of the resistance surfaces. These tubes carry inwardly extending arms $A^6$, the inner ends of which are hinged together by a hinge pin B. The tube of each resistance surface is also provided with outwardly extending arms A⁷, the outer ends of which are anchored at A⁸ to anchor rods A⁹ fixed at A¹⁰ to the wing of the aircraft. The hinge pin B extends longitudinally along the resistance surface and is connected to the apices B¹ of triangular links consisting of members B², B³ and B⁴. These triangular links are mounted at a corner B⁵ remote from the hinge on a bracket B⁶ fixed to the rear spar C of the wing. The links B⁴ are connected together by the connecting member B⁷, and to a bell crank lever B⁸ by a rod B⁹, which bell crank lever B⁸ is operable in a lateral direction from the position where the pilot is located in the fuselage, by means of the cable B¹⁰. By this operation the triangular links B², B³ and B⁴ can be moved from the position shown in Figure 1 to the position shown in Figure 2 in which the hinge pin B is moved rearwardly relatively to the direction of flight. In this movement, due to the anchorage of the arms A⁷, the resistance surfaces are caused to open apart in proportion to the rearward travel of the said hinge.

In the construction illustrated in the accompanying drawings, the resistance surfaces not only move rearwardly with their angular outward adjustment, but also move to some extent in a lateral direction as will be seen from Figure 2 of the accompanying drawings. The necessity for this partial lateral movement may be avoided by causing the hinge to move in a straight path in a rearward direction, which movement could be secured by providing a link or other means of control to project the hinge bodily straight forward or straight aft instead of in a radial direction about the axis of oscillation of the triangular links.

Instead of arranging the anchorage for the resistance surfaces externally of said surfaces, as in the construction shown in Figures 1–4, an arrangement such as shown in Figures 5 and 6 may be employed, in which the resistance surfaces are anchored by the bracket D fixed to the rearward spar C of the wing and extending between the resistance surfaces; this bracket D having a slot D¹ for the passage of the hinge pin B and carrying at its end a pivot D² for links D³ which serve to anchor the resistance surfaces at the points D⁴. Otherwise, the arrangement of the mechanism for moving the hinge pin B and for connecting the hinge pin to the resistance surfaces is the same as described in Figures 1–4.

In applying the invention to an aircraft in which directional control is effected by changing the resistance on one wing compared with the resistance on the other wing, the operation of the air brake on one wing may be independent of the operation of the air brake on the other wing. In such a construction, the rudder bar may be operated in the ordinary manner for the purpose of angularly opening the brake surfaces on one side only or to over-control the brake lever, which, in the normal way, would be used to open both brakes simultaneously. In such an arrangement, an independent brake lever would be employed which would tend to open both brakes, but by the application of the rudder bar, a variable resistance would be secured by the ruddering action applying appropriate brake resistance without interference by the brake lever. The brake lever preferably returns to neutral when let go, and it may be assisted to remain holding the brakes on by a catch which supports most of the resistance to return to neutral, thus preventing the brake being left on accidentally.

In the embodiment shown in the accompanying drawings the resistance surfaces are inset in the trailing edge of the wing but, alternatively these resistance surfaces could be mounted on outrigger arms behind the trailing edge of the wing. In this outstanding position behind the wing, the resistance surfaces when closed would appear like control surfaces but the action of the brake surfaces would be as hereinbefore described.

By the use of brakes constructed as described, the steepness of the glide of the aircraft may be considerably increased, thus facilitating gliding into a small field while permitting of the maintenance of the minimum flying speed which is necessary for retaining good control. The gliding angle is therefore variable at the will of the pilot.

What I claim as my invention and desire to secure by Letters Patent is:—

1. Airbrakes located at the trailing edges of aircraft wings comprising a hinged resistance surface adapted to be angularly adjusted from a non-effective braking position to an effective braking position and vice versa, a hinge for mounting said surface and adapted to permit of angular adjustment of such surface and means permitting said hinge to travel backwards relative to the direction of flight in proportion to the angular adjustment given to the resistance surface.

2. Airbrakes located at the trailing edges of aircraft wings comprising a hinged resistance surface adapted to be angularly adjusted from a non-effective braking position to an effective braking position and vice versa, a hinge for mounting said surface and adapted to permit of angular adjustment of such surface, means permitting said hinge to travel backwards relative to the direction of flight in proportion to the angular adjustment given to the resistance surface, and means adapted to cause the said surface to follow the required angular movement during its travel backwards.

3. Airbrakes located at the trailing edges of aircraft wings comprising a hinged resistance surface adapted to be angularly adjusted from a non-effective braking position to an effective braking position and vice versa, a hinge distant from the plane of said resistance surface for mounting said surface and adapted to permit of angular adjustment of such surface and means permitting said hinge to travel backwards relative to the direction of flight in proportion to the angular adjustment given to the resistance surface.

4. Airbrakes located at the trailing edges of aircraft wings comprising a hinged resistance surface adapted to be angularly adjusted from a non-effective braking position to an effective braking position and vice versa, a hinge distant from the plane of said resistance surface for mounting said surface and adapted to permit of angular adjustment of such surface, means permitting said hinge to travel backwards relative to the direction of flight in proportion to the angular adjustment given to the resistance surface, and means adapted to cause the said surface to follow the required angular movement during its travel backwards.

5. Airbrakes located at the trailing edges of aircraft wings comprising two hinged resistance surfaces adapted to be angularly adjusted in opposite directions from a non-effective braking position to an effective braking position and vice versa, a hinge for mounting said surfaces and adapted to permit of angular adjustment of such surfaces, and means permitting said hinge to travel backwards relative to the direction of flight in proportion to the angular adjustment given to the resistance surfaces.

6. Airbrakes located at the trailing edges of aircraft wings comprising two hinged resistance surfaces adapted to be angularly adjusted in opposite directions from a non-effective braking position to an effective braking position and vice versa, a hinge between said surfaces for mounting said surfaces and adapted to permit of angular adjustment of such surfaces, means permitting said hinge to travel backwards relative to the direction of flight in proportion to the angular adjustment given to the resistance surfaces, and means adapted to cause the said surfaces to follow the required angular movement during their travel backwards.

7. Airbrakes located at the trailing edges of aircraft wings comprising two hinged resistance surfaces adapted to be angularly adjusted in opposite directions from a non-effective braking position to an effective braking position and vice versa, a hinge for mounting said surfaces and adapted to permit of angular adjustment of such surfaces, means permitting said hinge to travel backwards relative to the direction of flight in proportion to the angular adjustment given to the resistance surfaces, and links controlling said surfaces in their angular adjustment and determining the total bodily displacement in a rearward direction.

8. Airbrakes located at the trailing edges of aircraft wings comprising two hinged resistance surfaces adapted to be angularly adjusted in opposite directions from a non-effective braking position to an effective braking position and vice versa, a hinge between said surfaces for mounting said surfaces and adapted to permit of angular adjustment of such surfaces, means permitting said hinge to travel backwards relative to the direction of flight in proportion to the angular adjustment given to the resistance surfaces, and links adapted to cause the said surfaces to follow the required angular movement during their travel backwards.

9. Airbrakes for aircraft comprising a hinged resistance surface adapted to be angularly adjusted from a non-effective braking position to an effective braking position and vice versa, a hinge for mounting said surface and adapted to permit of angular adjustment of such surface, triangular links for moving said hinge backwards relative to the direction of flight, and means adapted to cause the said surface to follow the required angular movement in proportion to the backward movement of the hinge.

10. Airbrakes for aircraft comprising two hinged resistance surfaces adapted to be angularly adjusted in opposite directions from a non-effective braking position to an effective braking position and vice versa, a hinge for mounting said surfaces and adapted to permit of angular adjustment of such surfaces, triangular links for moving said hinge backwards relative to the direction of flight in proportion to the angular adjustment given to the resistance surfaces, and means adapted to cause the said surfaces to follow the required angular movement during their travel backwards.

11. Airbrakes for aircraft comprising a hinged resistance surface adapted to be angularly adjusted from a non-effective braking position to an effective braking position and vice versa, a hinge for mounting said surface and adapted to permit of angular adjustment of such surface, means permitting said hinge to travel backwards relative to the direction of flight, arms connecting said surface to said hinge, and means for anchoring said arms adapted to cause the resistance surface to move angularly in proportion to the backward movement given to said hinge.

12. Airbrakes for aircraft comprising two hinged resistance surfaces adapted to be angularly adjusted in opposite directions from a non-effective braking position to an effective braking position and vice versa, a hinge between said surfaces for mounting said surfaces and adapted to permit of angular adjustment of such surfaces, a fixed bracket between said surfaces, and links pivotally mounted on said bracket and pivotally connected to said surfaces adapted to permit said hinge to travel backwards relative to the direction of flight in proportion to the angular adjustment given to the resistance surfaces and adapted to cause the said surfaces to follow the required angular movement during their travel backwards.

In witness whereof I have hereunto set my hand.

GEOFFREY TERENCE ROLAND HILL.